(12) United States Patent
Singleton

(10) Patent No.: US 9,795,124 B2
(45) Date of Patent: Oct. 24, 2017

(54) INSECT ATTRACTING AND ELIMINATING DEVICE

(71) Applicant: Kaz USA, Inc., Southborough, MA (US)

(72) Inventor: Michael Singleton, Warwick, RI (US)

(73) Assignee: Helen of Troy Limited, Belleville, St. Michael (BB)

( * ) Notice: Subject to any disclaimer, the term of this patent is extended or adjusted under 35 U.S.C. 154(b) by 595 days.

(21) Appl. No.: 14/014,897

(22) Filed: Aug. 30, 2013

(65) Prior Publication Data

US 2014/0068999 A1    Mar. 13, 2014

Related U.S. Application Data

(60) Provisional application No. 61/695,656, filed on Aug. 31, 2012.

(51) Int. Cl.
*A01M 1/22*    (2006.01)
*A01M 1/04*    (2006.01)
*A01M 1/02*    (2006.01)

(52) U.S. Cl.
CPC .............. *A01M 1/223* (2013.01); *A01M 1/02* (2013.01); *A01M 1/04* (2013.01)

(58) Field of Classification Search
CPC .......... A01M 1/02; A01M 1/04; A01M 1/145; A01M 1/2083; A01M 1/22; A01M 1/223
USPC ................................ 43/107, 112, 113, 132.1
See application file for complete search history.

(56) References Cited

U.S. PATENT DOCUMENTS

| 4,182,069 | A   | * | 1/1980  | De Yoreo ............... A01M 1/04 43/112 |
| 4,387,529 | A   | * | 6/1983  | Hedstrom ............... A01M 1/04 43/112 |
| 8,424,239 | B1  | * | 4/2013  | Gallo ...................... A01M 1/04 43/112 |
| 2003/0172581 | A1 | * | 9/2003  | Nosse ..................... A01M 1/04 43/113 |
| 2003/0192229 | A1 | * | 10/2003 | Wilbanks ............... A01M 1/023 43/112 |
| 2006/0254124 | A1 | * | 11/2006 | DeYoreo ............... A01M 1/023 43/139 |
| 2009/0094883 | A1 | * | 4/2009  | Child ...................... A01M 1/023 43/112 |
| 2010/0071254 | A1 | * | 3/2010  | Calkins ................. A01M 1/145 43/107 |
| 2010/0229459 | A1 | * | 9/2010  | Simchoni-Barak ... A01M 1/023 43/112 |
| 2012/0176765 | A1 | * | 7/2012  | Uchida .................. A01M 1/145 362/2 |
| 2015/0020437 | A1 | * | 1/2015  | Crawley ............. A01M 1/2016 43/113 |

* cited by examiner

*Primary Examiner* — Thien Thanh Pham

(57) ABSTRACT

An insect elimination device has an outer grid with an inner grid disposed within the outer grid. A voltage source powers the inner grid, the outer grid or both. A warming tube is disposed within the inner grid and provides a thermal lure. A UV light source is disposed within the warming tube to provide a first optical lure. A control circuit controls the duty cycle, which is greater than 0% and less than 100%, of the UV light source while the voltage source is powering the elimination zone of the inner grid and the outer grid to keep the thermal lure within a predetermined temperature range.

24 Claims, 7 Drawing Sheets

INSECT ATTRACTING AND ELIMINATING DEVICE

CROSS-REFERENCE TO RELATED APPLICATIONS

This application claims the benefit of U.S. Provisional Application No. 61/695,656, filed Aug. 31, 2012, the contents which are incorporated herein by reference.

FIELD OF THE INVENTION

The present invention generally relates to devices used to eliminate annoying pests and insects. In particular, the present invention relates to an insect elimination device that attracts and eliminates pests, such as flying insects.

DESCRIPTION OF THE RELATED ART

Known in the art are various devices that attract and eliminate various types of insects that are attracted by light, typically flying insects. A light source disposed near charged wires of an electric grid serves as a lure, in which insects contacting charged wires with a high voltage between them are electrocuted.

In particular, mosquitoes are known to be attracted by heat, light, scent, movement, and vibration. Mosquitoes are attracted by ultraviolet ("UV") light from a distance. However, it has been shown that at close proximity this attraction to UV light is neutralized by the brightness of the light source, which then actually repels mosquitoes the closer they get to that UV light source.

A need for improved insect elimination devices therefore exists that will more effectively elimination undesirable insects, such as mosquitoes.

SUMMARY OF THE INVENTION

In one aspect a device for attracting and eliminating insects is provided. A preferred embodiment insect elimination device includes an outer grid with an inner grid disposed at least partially within the outer grid. A voltage source powers at least one of the inner grid and the outer grid, providing an elimination zone. A warming tube is disposed at least partially within the inner grid and provides a thermal lure. A UV light source is disposed at least partially within the warming tube to provide a first optical lure. A control circuit controls the duty cycle of the UV light source that is greater than 0% and less than 100% while the voltage source is powering the inner grid or the outer grid to keep the thermal lure within a predetermined temperature range, such as between 34° C. and 42° C. In specific preferred embodiments the elimination grid spacing between the inner grid and the outer grid is from 6.0 mm to 9.0 mm.

In various embodiments a second optical lure can be provided to provide an optical lure when the UV light source is turned off. Other embodiments may also include a chemical lure disposed in or near the elimination zone. Alternate embodiments may include a single electrical grid.

Preferred embodiments include a duty cycle selector, and the control circuit controls the duty cycle of the UV light source according to a signal generated by the duty cycle selector.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Figure 1:
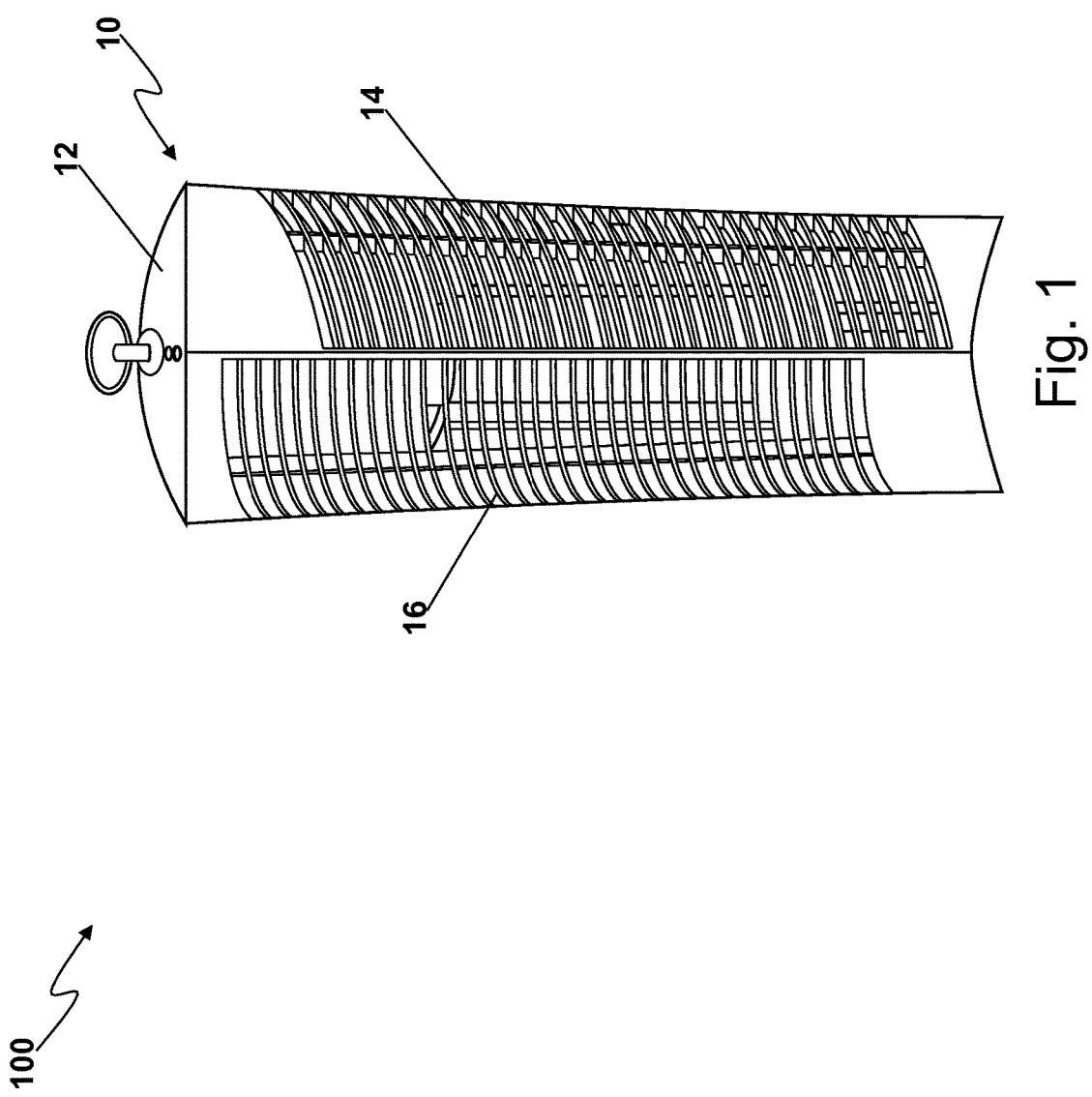
FIG. 1 is a front view of an embodiment insect attracting and eliminating device.

In addition to being attracted to ultraviolet ("UV") light, mosquitoes also have thermal receptors that are attuned to heat within the human to avian body temperature ranges. These thermal receptors have a finite sensing range and beyond about 10 feet a mosquito cannot detect heat variations between separate heat sources. An embodiment insect elimination device 100 shown in FIGS. 1-6 is designed in view of these characteristics to more effectively attract and elimination mosquitoes and other nuisance insects.

The insect attracting device 100 includes an external housing 10 into or onto which are disposed or set the various components of insect elimination device 100, as discussed more fully below. The external housing 10 is preferably made from an electrically insulating material, such as plastic, and in particularly preferred embodiments is made from polycarbonate. The embodiment external housing 10 includes a top cap 12, a right outer grid 14, a left outer grid 16, a bottom housing 18 and a bottom cap 20. The bottom cap 20 is pivotably connected to the bottom housing 18 by way of hinge 26, and lockably engages with bottom housing 18 by way of a snap fitting 24. The bottom cap 20 provides a door to the interior region 5 of the external housing 10 to access components therein.

Various embodiments of The insect attracting device 100 include a lure 30 to chemically attract nuisance insects, such as mosquitoes. Any suitable lure 30 may be used, which is preferably removably connected to or in The insect attracting device 100. For example, it may be possible to switch out different types of lures 30 to target specific species of nuisance insect as may be desired based upon changing seasons, locations, etc. In one specific embodiment, the lure 30 includes octanol. However, other types of lures 30 are certainly possible, such as those that have excess amounts, or otherwise emit, carbon dioxide or the like. In the specific embodiment insect elimination device 100, a surface of the bottom cap 20, such as external surface 21, serves as a mount 29 to removably secure the lure 30. Of course, any suitable method may be used to removably secure the lure 30 to The insect attracting device 100 at any desired location on or in The insect attracting device 100. By way of example, in the embodiment insect elimination device 100, the lure 30 includes flanges 32 which slidably engage with corresponding notches or tracks 22 provided on the mount 29.

Figure 2:
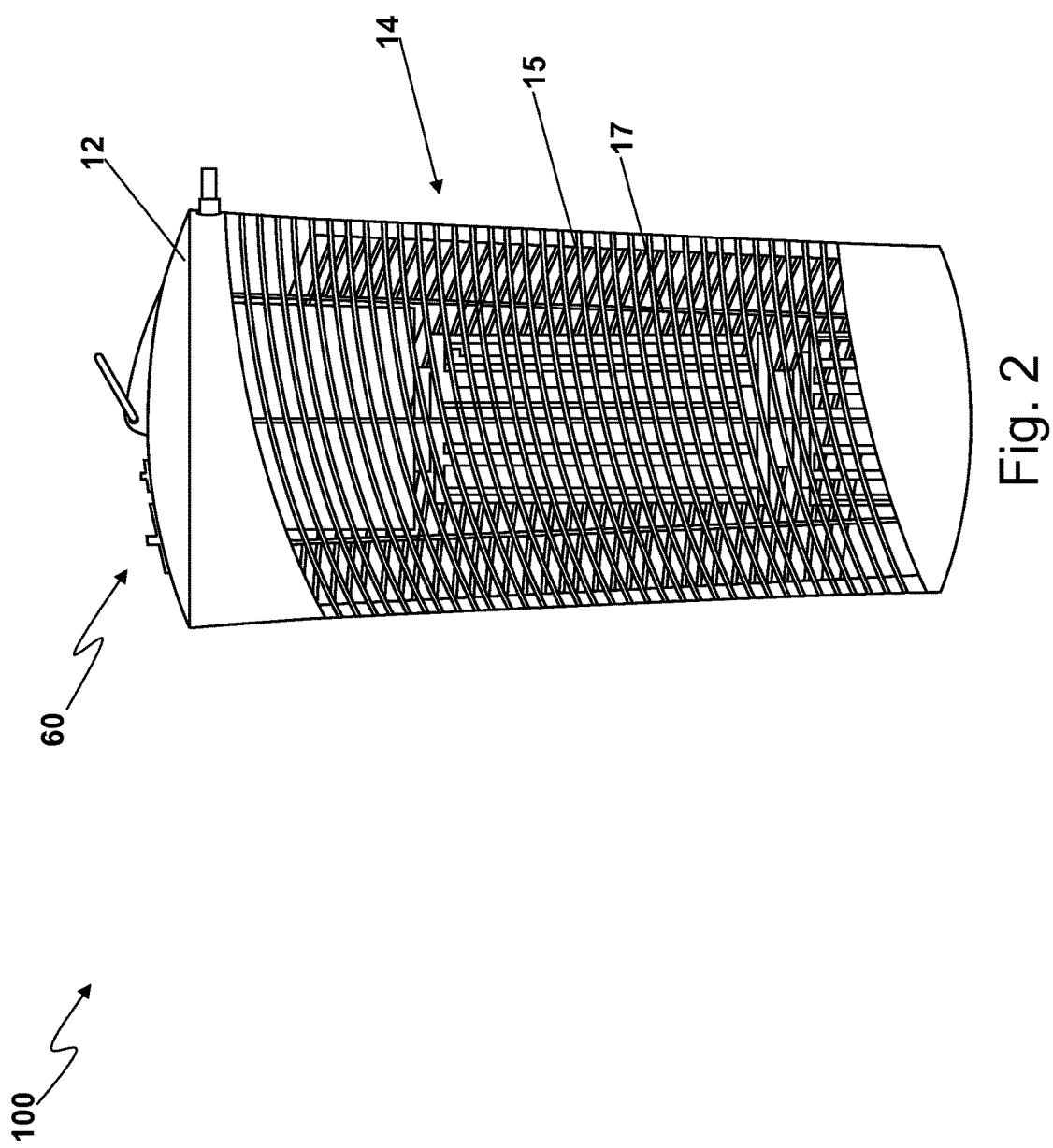
FIG. 2 is a side view of the insect attracting and eliminating device shown in FIG. 1.

As best shown in FIG. 2, the outer grids 14, 16 are formed from a plurality of spaced ribs 15 that are in substantially parallel arrangement to each other and held in place by a plurality of risers 17. The spacing between immediately adjacent ribs 15 is preferably large enough to allow the flying passage of the largest target nuisance insect, yet small enough to prevent hands and fingers from contacting electrically charged components within the interior region 5 of the housing 10. Preferred spacings for the ribs 15 are from 1 mm to 20 mm, more preferably still from 3 mm to 15 mm, and in a specifically preferred embodiment is about 5 mm to 7 mm.

Figure 6:
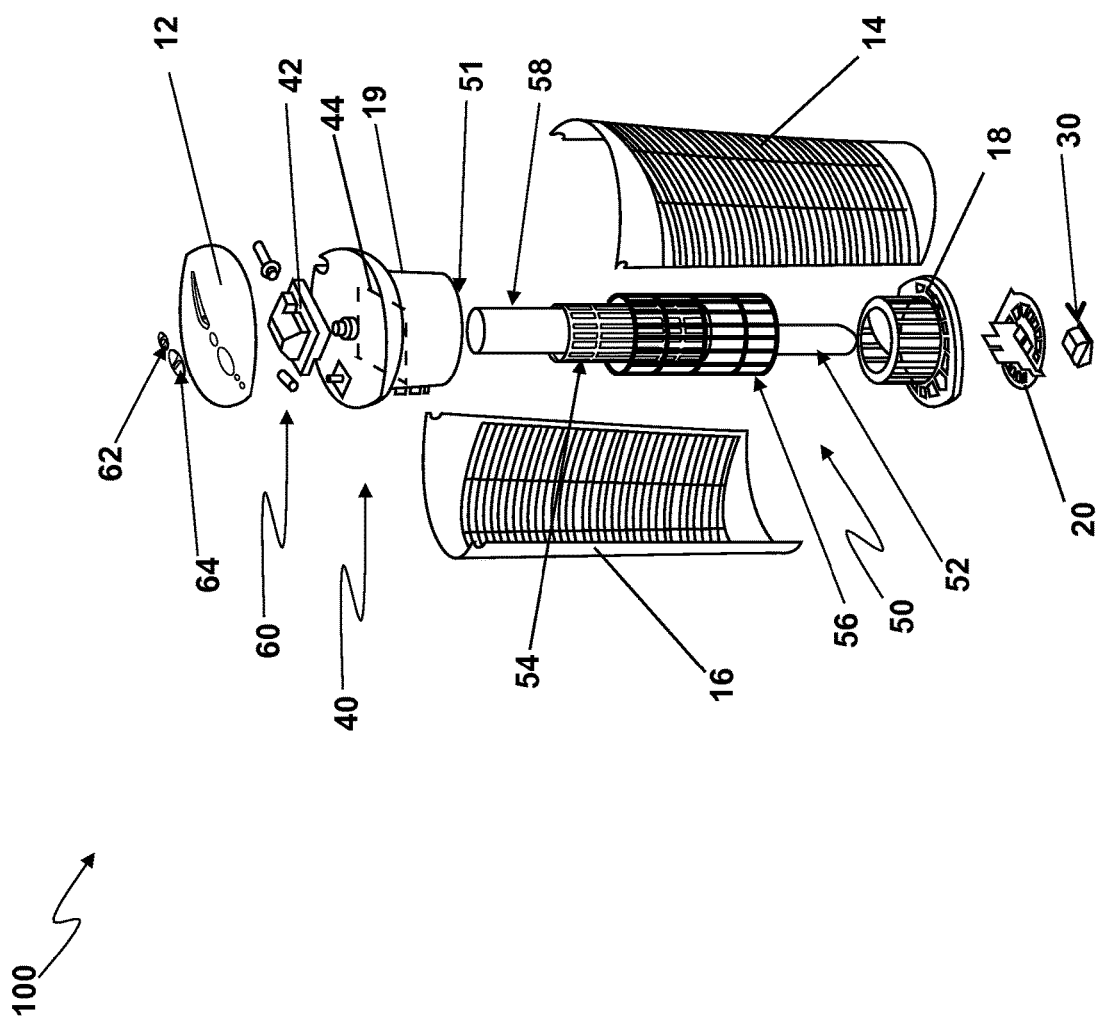
FIG. 6 is an exploded view of the insect attracting and eliminating device shown in FIG. 1.

Reference is drawn to FIG. 6 for the various interior components disposed within interior region 5 of housing 10. The insect attracting device 100 includes a top housing 19 to which are mechanically coupled the left outer grid 16, right outer grid 14 and top cap 12. The top housing 19 is preferably made from an electrically insulating material, such as polycarbonate. Control circuitry 40 for The insect attracting device 100 is disposed within or coupled to the top housing 19. The control circuitry 40 includes, for example, at least one transformer 42 that converts line voltage into suitably high voltage to power components in an electrical elimination mechanism 50 that is disposed within the interior region 5. The transformer 42 is electrically coupled to a control circuit board 44 that includes power driver circuits, electronic control circuits and the like as known in the art to control operations of the transformer 42 and the other electrical components discussed in the following. Any suitable circuits as known in the art that provide the functionality discussed here and in the following may be employed with the control circuit board 44. Of course, the control circuit board 44 may, as a practical matter, be formed from two or more separate circuit boards, components or combinations thereof; for the sake of simplicity, the control circuit board 40 here is considered as only a single PCB board with components mounted thereon. Other mechanical configurations are clearly possible, however. Also, electrically coupled to the control circuit board 44 are input elements 60 for providing input, both user and environmental, to the control circuit board 44 as parameters to control operations of the electrical elimination mechanism 50.

Figure 3:
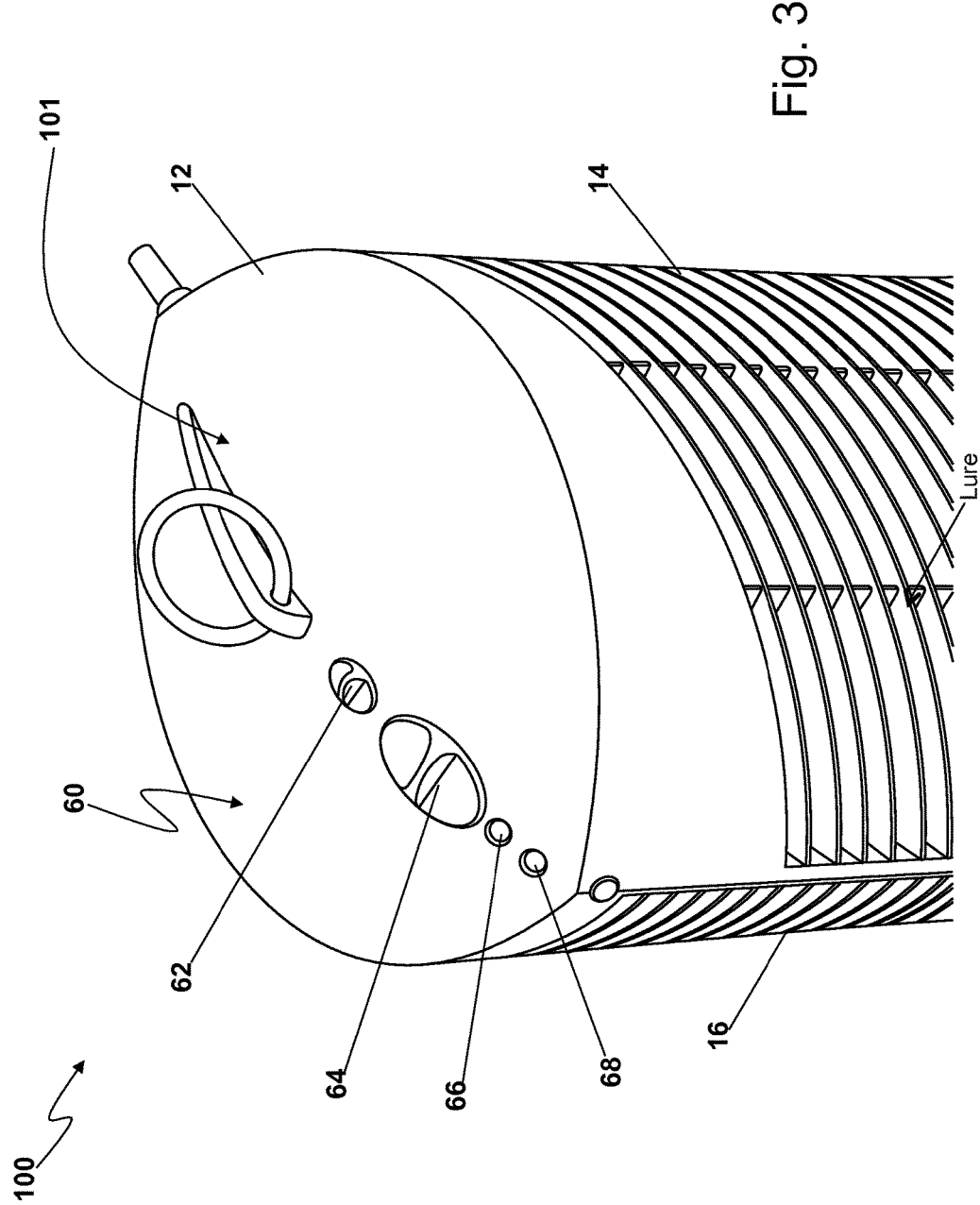
FIG. 3 is a detailed top perspective view of the insect attracting and eliminating device shown in FIG. 1.
Figure 4:
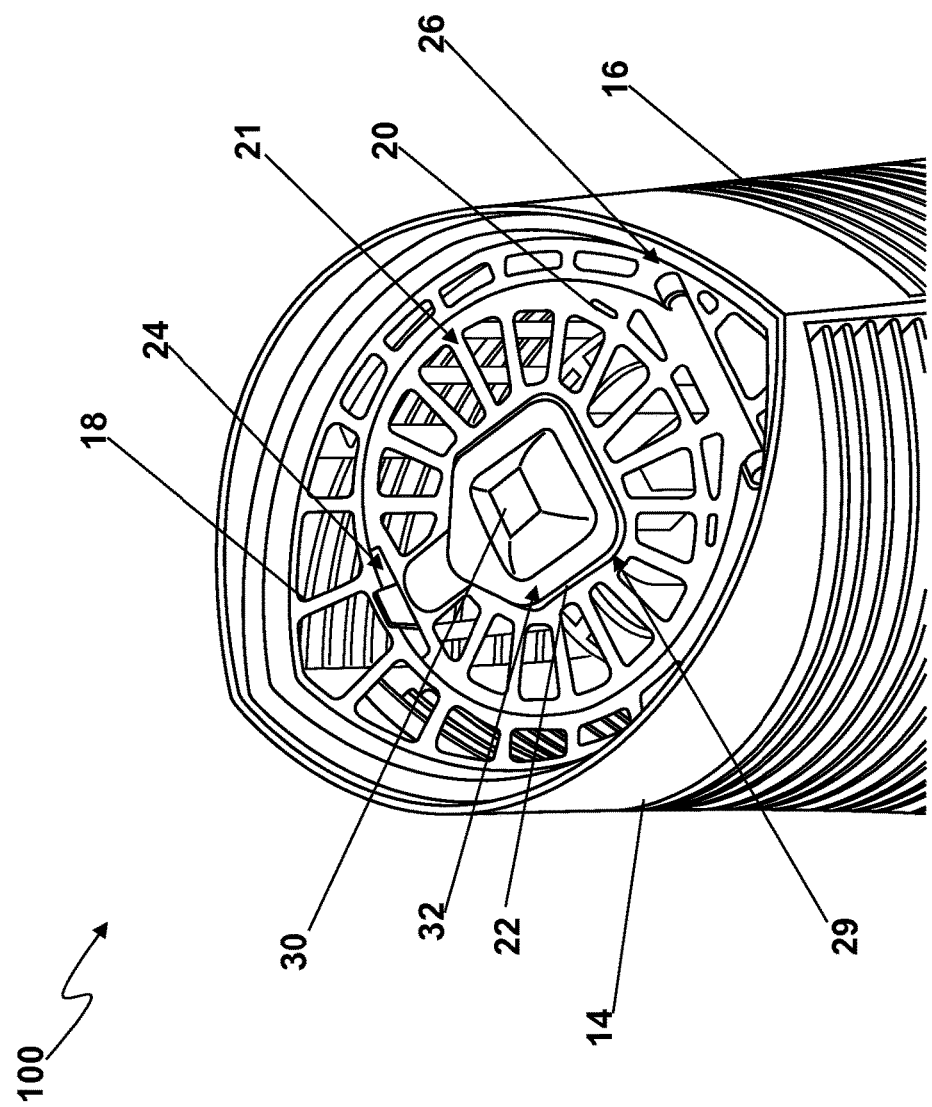
FIG. 4 is a detailed bottom perspective view of the insect attracting and eliminating device shown in FIG. 1.
Figure 5:
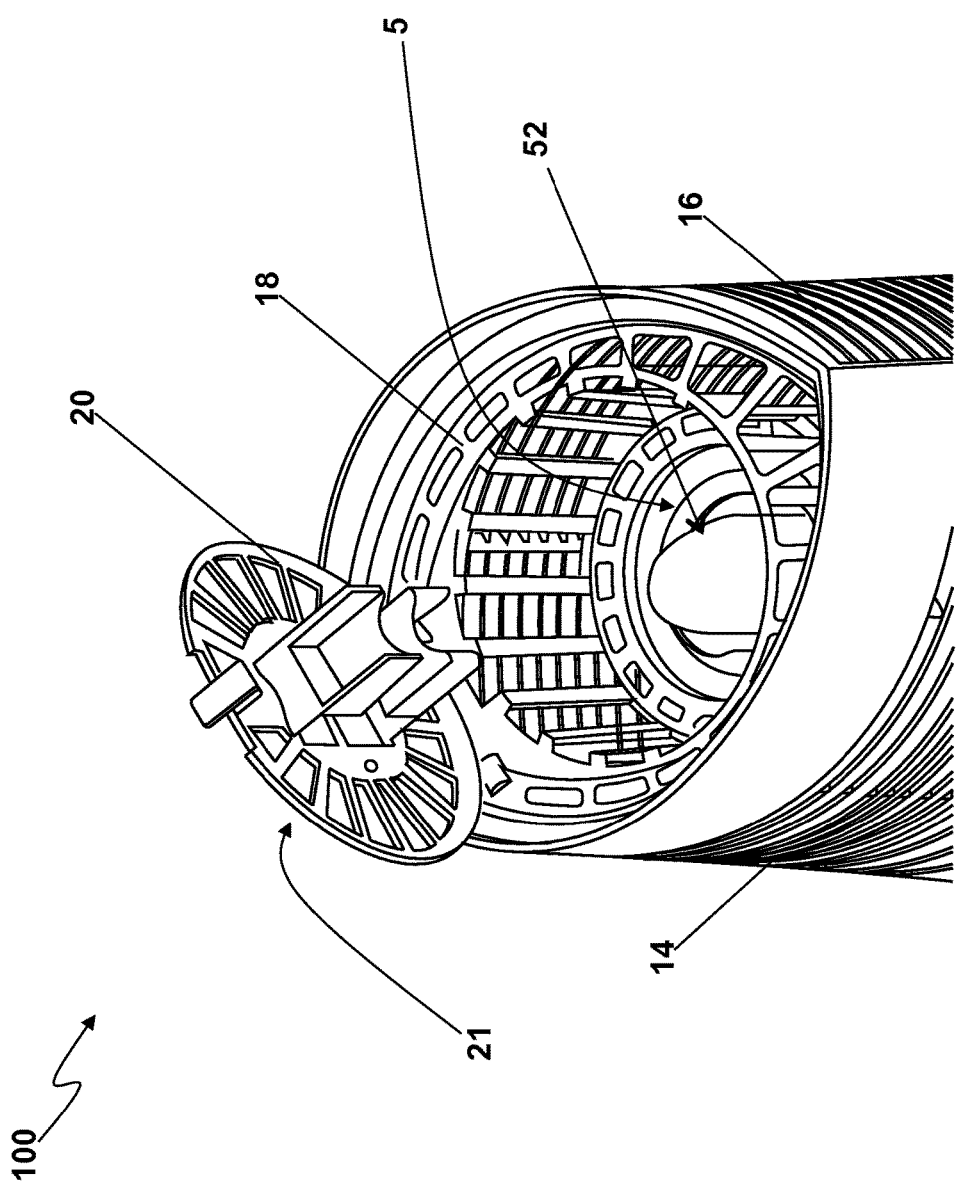
FIG. 5 is another bottom perspective view of the insect attracting and eliminating device shown in FIG. 1.

With further reference to FIG. 3, embodiment input elements 60 include a duty cycle selector 62, a light sensor switch 64, a photocell 66 and an operating status indicator 68; the operating status indicator 68 is preferably a light emitting diode (LED), although any suitable light source or indicator may be used. The top cap 12 may include one or more respective openings to permit the input components 62-68 to be exposed from the top surface 101 of The insect attracting device 100, yet electrically coupled to the control circuit board 44 disposed below the input components 62-68 within the top housing 19. It will be understood that the input components 62-68 are not limited to the physical configurations or positions shown.

The duty cycle selector 62 is coupled to the circuit board 44 to generate a signal that indicates a user-desired duty cycle for a component in the electrical elimination mechanism 50, as discussed in further detail; this may be a rotary switch, a slide switch, a plurality of buttons or the like. The light sensor switch 64 generates a signal for the control circuit board 44 that indicates whether the user desires The insect attracting device 100 to operate automatically based upon the ambient light, or to remain on at all times. In support of this functionality, a photo sensor 66 is provided, preferably on the top surface 101, to detect the level of ambient light; the photo sensor 66 may be a photocell or any other suitable light-detecting mechanism. When the light sensor switch 64 is set to a first state, indicating automatic operation, the control circuitry 40 will power the transformer 42 to activate the electrical elimination mechanism 50 if the photo sensor 66 develops a signal that indicates that the ambient light has fallen below a threshold value. This threshold value may be selected to correspond to light levels that are typical of dusk, for example, and may be determined experimentally and set, for example, by the user via another input element (not shown), hard wired at the factory, or the like. When the light sensor switch 64 is set to a second state, indicating continuous operation, the control circuitry 40 will power the transformer 42 to activate the electrical elimination mechanism 50 at all times. The operating status indicator 68 may indicate when the electrical elimination mechanism 50 is activated, or when The insect attracting device 100 is plugged in.

The electrical elimination mechanism 50 includes a UV light source 52, a secondary optical lure 51, an inner electrical grid 54, an outer electrical grid 56, and a warming tube 58. The inner electrical grid 54 is at least partially disposed within the outer electrical grid 56, and in preferred embodiments is completely disposed within the outer electrical grid 56. As noted above, one or both of the inner electrical grid 54 and outer electrical grid 56 are powered by the transformer 42 to thereby provide an elimination zone between the electrical grids 54, 56. In a preferred embodiment, the inner electrical grid 54 is powered by the transformer 42 so as to be energized in a high voltage state as provided by transformer 42, while the outer electrical grid 56 is grounded. As noted above, control circuitry 40 controls operations of the transformer 44, and by extension whether or not the inner or outer electrical grids 54, 56 are energized.

The warming tube 58, coupled to the top housing 19, is at least partially disposed within the inner electrical grid 54 and is made from glass, plastic or any other suitable material that is transparent or translucent to the UV light generated by the UV light source 52. The UV light source 52, in turn, is disposed at least partially within the warming tube 58 and is electrically coupled to the control circuit 40 which controls the lighting state of the UV light source 52. It will be appreciated that the warming tube 58 need not be limited only to the shape of a tube but may be any shape that can accept at least a portion of the UV light source 52. The UV light source 52 can be, for example, a UV bulb, and generates frequencies that are selected to optically lure one or more target species of nuisance insect.

The secondary optical lure 51 is preferably an LED that is electrically coupled to and controlled by the control circuitry 40 and serves as a further optical lure in addition to the primary optical lure provided by UV light source 52. The secondary optical lure 51 can generate light, for example, with a brightness that peaks at about 400 nm as a function of wavelength, which is desirable as light around such wavelengths attracts mosquitoes. The secondary optical lure 51 can be disposed, for example, on a bottom surface of the top housing 19 in or adjacent to the warming tube 58. In preferred embodiments the control circuitry 40 keeps the secondary optical lure 51 turned on at all times such that the electrical elimination mechanism 50 is energized.

The inner electrical grid 54 and outer electrical grid 56 each form a mesh of an electrically conductive material, such as steel, aluminum, copper or the like that defines a respective interior cavity. The spacing of the mesh for the outer electrical grid 56 is preferably sufficiently wide to permit the largest targeted nuisance insect to pass through the outer electrical grid 56 and into the respective interior cavity towards the inner electrical grid 54. The spacing of the mesh for the inner electrical grid 54 is preferably smaller than that of the outer electrical grid 56, and is preferably small enough to prevent the smallest targeted nuisance insect from passing through the mesh structure of the inner electrical grid 54.

An elimination grid spacing is the average or typical distance between the outer surface of the inner electrical grid 54 and the inner surface of the outer electrical grid 56, i.e., the average perpendicular distance between the immediately adjacent facing surfaces of the two grids 54, 56. For example, if the electrical grids 54, 56 are cylindrical in shape and coaxial with each other, then the elimination grid spacing would be $R_1$-$R_2$, where $R_1$ is the radius of the inner surface defined by outer grid 56 and $R_2$ is the radius of the outer surface defined by inner grid 54. The elimination grid spacing for The insect attracting device 100 is preferably set in accordance with the size of the target nuisance insect. In preferred embodiments for The insect attracting device 100, the elimination grid spacing is from 6.0 mm to 9.0 mm, more preferably still from 8.0 mm to 9.0 mm, and more preferably still 8.0 mm+/−0.5 mm. This spacing is preferred as being within range of most nuisance insects (midges, etc.) but in particular for mosquitoes, where the average range for mosquito wingspan is from 8 mm to 9 mm for the most common species.

The UV light source 52 serves as the primary optical lure for the targeted specie or species of nuisance insect. The UV light source 52 also, however, serves as a thermal warming source for the warming tube 58. Warming tube 58 serves as a thermal lure for a targeted specie or species of nuisance insect. When the UV light source 52 is turned on it causes warming of the thermal tube 58 while also serving to optically attract the targeted species of nuisance insect. When the UV light source 52 is turned off, the thermal tube 58 begins to cool. Optical luring may still be provided, however, by secondary optical lure 51. The control circuitry 40 is capable of driving the UV light source 52 with a selectable duty cycle that is both less than 100% and greater than 0% while the electrical elimination mechanism 50 is energized and active. In other embodiments, the intensity of the brightness of the UV source 52 may be varied in a manner similar to these selectable duty cycles.

In particular, the control circuitry 40 controls the duty cycle of the UV light source 52 so that the warming tube 58 is kept within a target range of temperatures that is adapted to thermally lure one or more targeted species of nuisance insect. For example, in preferred embodiments, the control circuitry 40 controls the duty cycle of the UV light source 52 so that the warming tube 58 remains between the human, aviary or both body temperature ranges, such as between 34° C. and 42° C. Any suitable timing and driving circuitry as known in the art may be used within the control circuitry 40 to provide this functionality. As temperature sensor may be provided, for example, to determine the temperature of the warming tube 58.

In preferred embodiments the control circuitry 40 controls the duty cycle of the UV light source 52 in accordance with a signal generated by the duty cycle selector 62. For example, the duty cycle selector 62 may have two possible settings: a first in which the UV light source 52 has a 100% duty cycle (i.e., always on), and a second in which the duty cycle is configured to keep the warming tube 58 within a desired temperature range. In other embodiments, multiple settings or positions can be provided for the duty cycle selector 62, each corresponding to a different temperature range for the warming tube 58 so as to target a different respective specie or species of nuisance insect.

The control circuitry 40 may be configured to drive the duty cycle of the UV light source 52 in accordance with each respective selection of the duty cycle selector 62, so that the warming tube 58 remains within each respective temperature range selected by the user. The respective duty cycles for each temperature range may be predetermined by the control circuitry 40 (i.e., hardwired or otherwise pre-programmed into the control circuitry 40), or may be controlled based upon the input of a temperature sensor. The duty cycle selector 62 may include labeling indicative of each possible option so that the user can select an appropriate duty cycle, and hence temperature range for warming tube 58, based upon easily understood indicia. Alternatively, the duty cycle selector 62 may permit the user to manually control the duty cycle, such as by way of an analog input, such as a slide switch or the like, to select a duty cycle from a range of possible duty cycles, and thereby obtain a suitable duty cycle by trial and error.

The embodiment insect elimination device 100 provides a multi-level system designed to attract and eliminate nuisance insects, such as mosquitoes. A first level of attraction, optical in nature, is provided by the primary optical lure, UV light source 52; a second level of attraction, also optical in nature, is provided by the secondary optical lure 51. A third level of attraction, chemical in nature, is provided by the chemical lure 30, such as by using octanol. A fourth level of attraction, thermal in nature, is provided by the warming tube 58 as warmed by the appropriately duty-cycled UV light source 52. During the period of time that the UV light source 52 is cycled off, the secondary optical lure 51 serves to optically attract nuisance insects, such as mosquitoes. The combination of these multiple lures 30, 51, 52, 58 serves to strongly attract nuisance insects into the elimination grid area 54, 56. In preferred embodiments, since both the warming tube 58, primary optical lure 52 and secondary optical lure 51 are located inside the inner elimination grid 54, the insect is required to contact the grids 54, 56 prior to reaching the illuminated warming tube 58, and in so doing creates an electrical pathway between the inner electrical grid 54 and outer electrical grid 56 that sends a surge of electricity through the insect that is sufficiently powerful to render the insect lifeless. Further, by duty cycling the UV light source 52, embodiment insect elimination devices provide a period of time in which proximity to the UV light source 52 does not repel the nuisance insect, since the UV light source 52 is dimmed or completely turned off; the insect is still lured, however, by secondary light source 51, chemical lure 30 and thermal lure 58.

Figure 7:
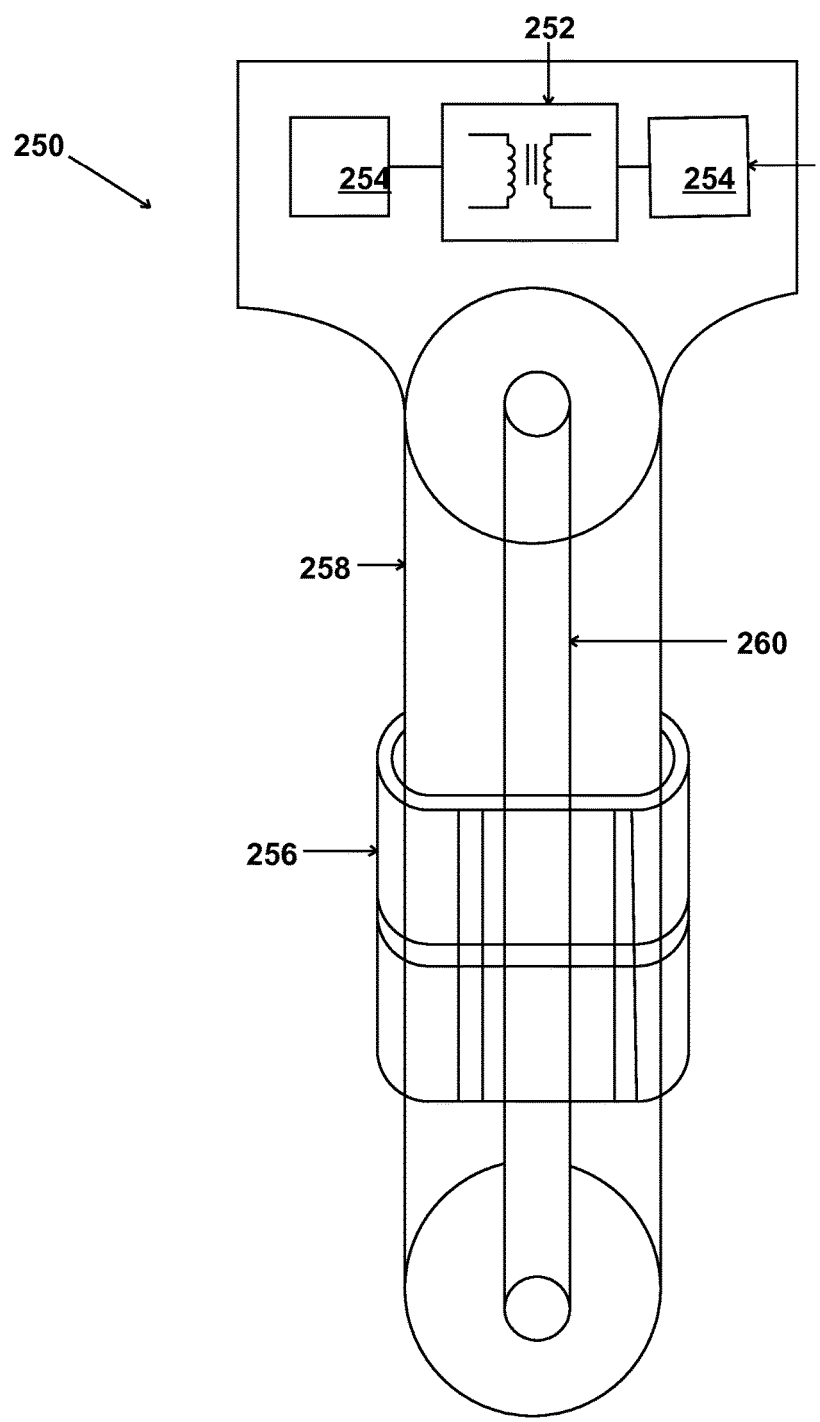
FIG. 7 is a side view of the elimination mechanism in an alternate embodiment.

In an alternate embodiment 200, as depicted in FIG. 7, the components and housing structure are substantially similar to embodiment 100. However, the electrical elimination mechanism 250 includes a single electrical grid 256. A transformer 252 energizes the electrical grid 256 to a high voltage state and control circuitry 254 controls operations of transformer 252. Control circuitry 254 may control operations of the device 200 in much the same manner as the control circuit in the first embodiment device 100. The electrical grid 256 forms a mesh of an electrically conductive material, such as steel, aluminum, copper or the like that defines a respective interior cavity. The spacing of the electrical grid 256 is preferably small enough to prevent the smallest nuisance insect from passing through the mesh structure. The warming tube 258 is at least partially disposed within the interior cavity defined by electrical grid 256 and is made from glass, plastic, or any other suitable material that is transparent or translucent to the UV light. A UV light source 260 is disposed within the thermal tube.

Those skilled in the art will recognize that the present invention has many applications, may be implemented in various manners and, as such is not to be limited by the foregoing embodiments and examples. Any number of the features of the different embodiments described herein may be combined into one single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there had been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. An insect attracting device comprising:
   an outer grid;
   an inner grid disposed at least partially within the outer grid, wherein a spacing between the outer grid and the inner grid corresponds to an elimination zone;
   a voltage source powering at least one of the inner grid and the outer grid;
   a thermal lure disposed in a predetermined position in relation to the elimination zone, the thermal lure including a warming tube disposed at least partially within the inner grid or the outer grid;
   a first optical lure disposed at least partially within the warming tube and thermally coupled to the thermal lure, and the warming tube comprises material transparent or translucent to energy generated by the first optical lure; and
   a control circuit to control the first optical lure to thereby control a temperature of the thermal lure;
   wherein the control circuit controls at least a duty cycle of operation of the first optical lure to be greater than 0% and less than 100% while the voltage source is powering the at least one of the inner grid and the outer grid, so as to maintain the thermal lure within a predetermined temperature range.

2. The insect attracting device of claim 1, wherein the warming tube is disposed at least partially within the inner grid.

3. The insect attracting device of claim 2 wherein the control circuit is configured to control the duty cycle to maintain the warming tube within a predetermined temperature range.

4. The insect attracting device of claim 3 wherein the predetermined temperature range is between 34° C. and 42° C.

5. The insect attracting device of claim 2 further comprising a second optical lure that is different from the first optical lure.

6. The insect attracting device of claim 2 further comprising a chemical lure.

7. The insect attracting device of claim 2 further comprising a duty cycle selector, wherein the control circuit controls the duty cycle of the first optical lure according to a signal generated by the duty cycle selector.

8. The insect attracting device of claim 2 wherein the control circuit comprises a light sensor to detect a level of ambient light to produce a sensor signal and the control circuit utilizes the light sensor signal to determine a mode of operation of the insect attracting device.

9. The insect attracting device of claim 8 wherein the mode of operation includes a first mode where the insect attracting device operates at select times dependent on the ambient light and a second mode where the insect attracting device remains on at all times.

10. The insect attracting device of claim 2 wherein the inner and outer grids are cylindrical.

11. The insect attracting device of claim 2 wherein the elimination zone between the inner grid and the outer grid is from 6.0 mm to 9.0 mm.

12. The insect attracting device of claim 2 wherein an outer grid mesh spacing is greater than an inner grid mesh spacing.

13. The insect attracting device of claim 12 wherein the outer grid mesh spacing is sufficiently large to allow target insects through the outer grid.

14. The insect attracting device of claim 12 wherein the inner grid mesh spacing is sufficiently small to block target insects from proceeding through the inner grid.

15. The insect attracting device of claim 1, wherein the warming tube is disposed at least partially within the outer grid.

16. The insect attracting device of claim 15 wherein the control circuit is configured to control the duty cycle to maintain the warming tube within a predetermined temperature range of between 34° C. and 42° C.

17. The insect attracting device of claim 15 further comprising at least one of a second optical lure and a chemical lure.

18. The insect attracting device of claim 15 further comprising a duty cycle selector, wherein the control circuit controls the duty cycle of the first optical lure according to a signal generated by the duty cycle selector.

19. A method for attracting an insect comprising:
   providing an insect attracting device comprising: an outer grid; an inner grid disposed at least partially within the outer grid, wherein a spacing between the outer grid and the inner grid corresponds to an elimination zone; a voltage source powering at least one of the inner grid and the outer grid; a thermal lure disposed in a predetermined position in relation to the elimination zone, the thermal lure including a warming tube disposed at least partially within the inner grid or the outer grid; a first optical lure disposed at least partially within the warming tube and thermally coupled to the thermal lure, and the warming tube comprises material transparent or translucent to energy generated by the first optical lure; and a control circuit to control the first optical lure to thereby control a temperature of the thermal lure; wherein the control circuit controls at least a duty cycle of operation of the first optical lure to be greater than 0% and less than 100% while the voltage source is powering the at least one of the inner grid and the outer grid, so as to maintain the thermal lure within a predetermined temperature range;

utilizing the first optical lure to lure the insect towards an electrically charged surface of at least one of the inner grid and the outer grid charged by the voltage source;

warming the thermal lure to further lure the insect towards the electrically charged surface; and reducing an operational level of the first optical lure while maintaining activity of the voltage source to continue electrically charging the electrically charged surface.

20. The method of claim 19 further comprising utilizing a chemical lure to further lure the insect towards the electrically charged surface.

21. The method of claim 19 further comprising utilizing a secondary optical lure to further lure the insect towards the electrically charged surface.

22. The method of claim 19 further comprising utilizing the first optical lure to warm the thermal lure.

23. The method of claim 19 further comprising controlling the duty cycle of the first optical lure to maintain the thermal lure within a predefined temperature range.

24. The method of claim 19 wherein the predefined temperature range is 34° C. to 42° C.

* * * * *